(12) United States Patent
Dobie et al.

(10) Patent No.: US 8,282,818 B1
(45) Date of Patent: Oct. 9, 2012

(54) SERPENTINE SUBMERGED ATTACHED GROWTH REACTOR

(76) Inventors: Keith Dobie, Humarock, MA (US); Andrew R. McBrearty, Milton, MA (US); Philip B. Pedros, Wakefield, MA (US)

( * ) Notice: Subject to any disclaimer, the term of this patent is extended or adjusted under 35 U.S.C. 154(b) by 279 days.

(21) Appl. No.: 12/807,059

(22) Filed: Aug. 26, 2010

Related U.S. Application Data

(63) Continuation-in-part of application No. 12/154,755, filed on May 27, 2008, now abandoned.

(51) Int. Cl.
  *C02F 3/04* (2006.01)
  *C02F 3/06* (2006.01)
(52) U.S. Cl. .................. 210/151; 210/257.1; 210/618
(58) Field of Classification Search ............ 210/150, 210/151, 257.1, 275, 286, 293, 617, 618
See application file for complete search history.

(56) References Cited

U.S. PATENT DOCUMENTS

| | | |
|---|---|---|
| 904,389 A | 11/1908 | White |
| 2,008,507 A | 7/1935 | Laughlin |
| 3,545,619 A | 12/1970 | Ettlich |
| 3,928,190 A | 12/1975 | Bebin |
| 4,159,945 A | 7/1979 | Savage |
| 4,925,552 A | 5/1990 | Bateson et al. |
| 5,449,453 A | 9/1995 | Tang |
| 5,500,112 A | 3/1996 | McDonald |
| 5,558,763 A | 9/1996 | Funakoshi et al. |
| 5,637,210 A | 6/1997 | Vail et al. |
| 5,795,480 A | 8/1998 | Keun et al. |
| 6,383,372 B1 | 5/2002 | Houck et al. |
| 2008/0173581 A1 | 7/2008 | Maclean |

*Primary Examiner* — Christopher Upton
(74) *Attorney, Agent, or Firm* — John P. McGonagle

(57) ABSTRACT

A single submerged attached growth bioreactor interconnected to an equalization tank and a clear well. The equalization tank receives raw wastewater and provides primary settling of solids from the waste water. The output from the equalization tank is sent into the bioreactor. The wastewater flow path through the bioreactor biofilter is serpentine. Wastewater enters the first cell of the biofilter and flows downward to an opening at the biofilter bottom that hydraulically connects the first cell to a biofilter second cell. In the second cell the wastewater flows up from the bottom to an opening above the media within the cell, which connects the second cell with a third biofilter cell. Wastewater then flows downward through the third cell to the bottom and exits the biofilter through a pipe connected to a pump in the clear well. The hydrostatic pressure created by the differential liquid levels drives forward flow through the cells and into an effluent pipe at the bottom of the third cell.

2 Claims, 2 Drawing Sheets

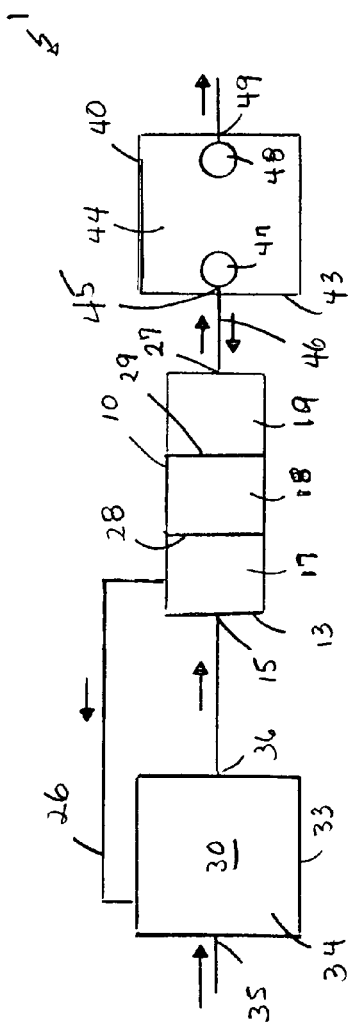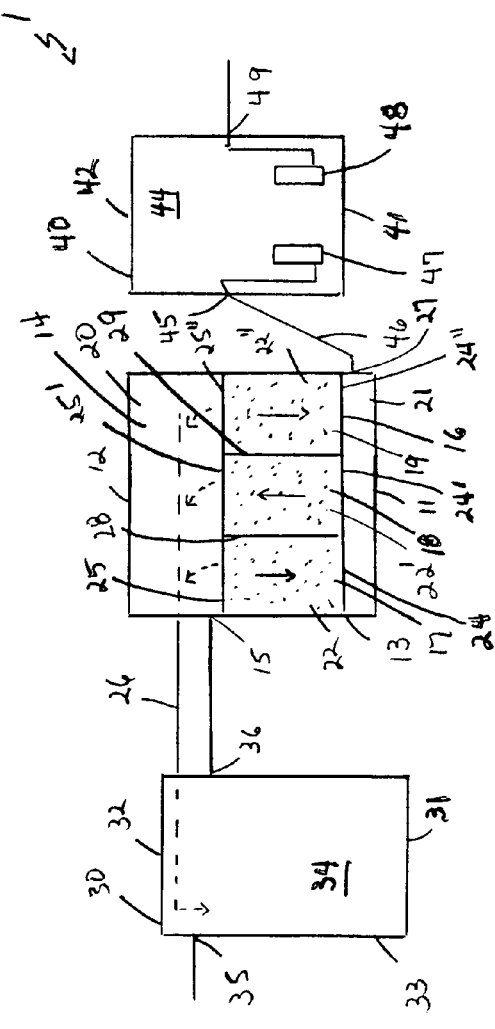
FIG. 1A
FIG. 1B

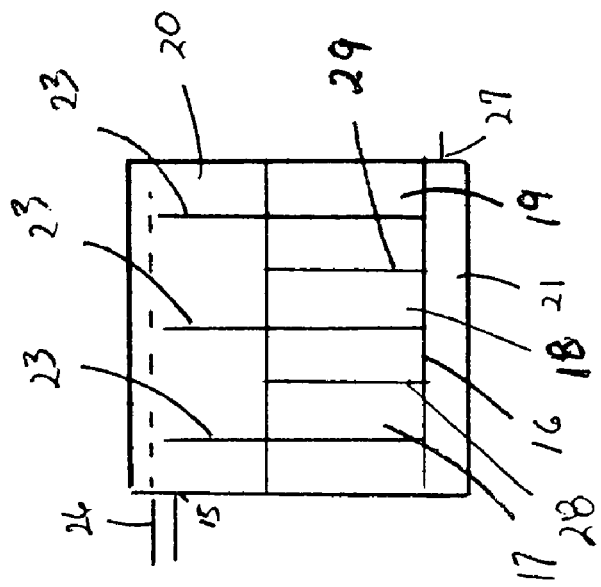
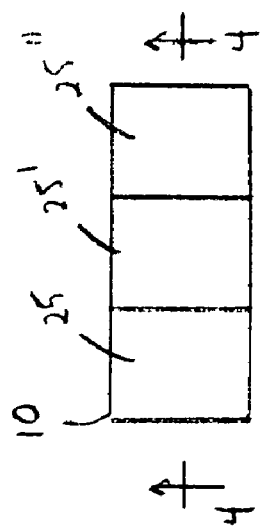
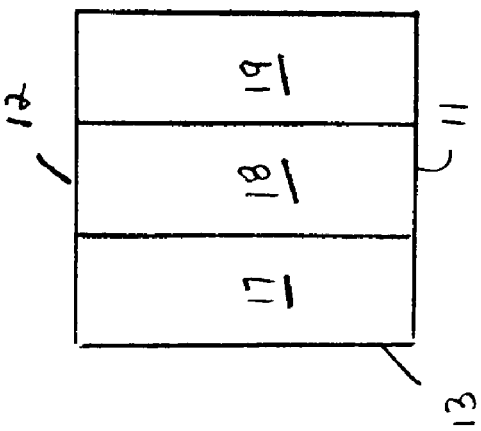
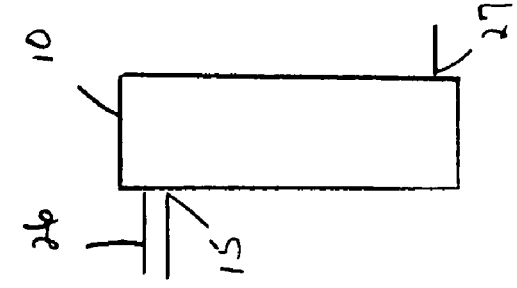

SERPENTINE SUBMERGED ATTACHED GROWTH REACTOR

This application is a continuation-in-part of U.S. patent application Ser. No. 12/154,755, filed May 27, 2008, now abandoned.

CROSS-REFERENCE TO RELATED APPLICATIONS

Applicants claim the priority benefits of U.S. Provisional Patent Application No. 60/932,078, filed May 28, 2007.

BACKGROUND OF THE INVENTION

This invention relates to waste treatment systems, and in particular, to a single-unit, single-zone bioreactor for the combined removal of organics and nitrogen while operating in both down-flow and up-flow modes with intermittent aeration to the filter.

The presence of nitrogen compounds in lakes, rivers and other water bodies promote unwanted growth of algae and other aquatic plants than consume dissolved oxygen. Consequently, there is a need to reduce nitrogen compounds in wastewater prior to discharge of the wastewater.

A number of processes and apparatus have been proposed for the nitrification and denitrification of wastewater containing nitrogen compounds. Generally, in such systems, wastewater containing nitrogen compounds, such as ammonia and organic nitrogen compounds, is passed through a reactor vessel under aerobic conditions and then passed through another reactor vessel under anoxic conditions to denitrify the nitrified wastewater. Nitrogen gas formed during denitrification is released to the atmosphere while the treated wastewater having a reduced level of nitrogen compounds is returned to the ground or receiving stream. Typically, such systems also utilize a settling tank or clarification zone after the wastewater has been biologically treated.

Accordingly, there is a need for a process and apparatus that reduces nitrogen compounds from wastewater to an environmentally acceptable level and is relatively simple to operate and maintain. One such process is based on a submerged attached growth bioreactor.

There are two primary advantages obtained in using a submerged attached growth bioreactor. A submerged attached growth bioreactor has a small volume requirement and eliminates the need for downstream clarification. Media used in a submerged attached growth bioreactor has a high specific surface area. This allows a high biomass concentration to be maintained within the reactor and, therefore, a short hydraulic time (HRT). The short HRT results in a relatively smaller volume bioreactor requirement to treat a given waste strength. In addition, the media provides physical filtration thereby avoiding the need for solids separation after the biological treatment process. Different configurations of submerged attached growth bioreactors have been conceived and advances in understanding of these systems have been made.

SUMMARY OF THE INVENTION

The present invention is comprised of a single submerged attached growth bioreactor, an equalization tank, and a clear well, as shown in FIG. 1. The bioreactor and tanks may be separate as shown in FIG. 1 or combined into one unit. The equalization tank receives wastewater and provides primary settling of solids from the waste water. The output from the equalization tank is sent into the bioreactor. The unique and significant feature of the invention bioreactor is that the wastewater flow path through the biofilter in the bioreactor is serpentine. See FIGS. 1 and 2. Wastewater enters the first cell of the biofilter and flows downward to an opening at the biofilter bottom that hydraulically connects the first cell to a biofilter second cell. In the second cell the wastewater flows up from the bottom to an opening above the media within the cell, which connects the second cell with a third biofilter cell. Wastewater then flows downward through the third cell to the bottom and exits the biofilter through a pipe connected to a pump in the clear well. The hydrostatic pressure created by the differential liquid levels within the cells is the driving force providing forward flow through the cells and into an effluent pipe at the bottom of the third cell.

The biofilter design provides for air and water to be distributed separately at the bottom of the biofilter, i.e., all three cells, and provides flexibility in the choice of media as well as aeration. Different media may be utilized in each of the cells to optimize treatment for oxidation of carbonaceous matter, nitrification or denitrification. In all cases the media would have a relatively high specific surface area. In addition, each cell can be aerated independently. This allows optimization of each individual cell for a specific biochemical transformation.

In addition, the wastewater may be recycles from the clear well through the biofilter by pumping clear well effluent back through all three cells. During a reverse flow, liquid flows up all three cells simultaneously and rises to a return flow/backwash pipe which transports the liquid by gravity back to the anoxic/equalization tank. Liquid thereby may flow through the biofilter in two directions, i.e., down-flow (forward flow) and up-flow (reverse flow). Notwithstanding the two directional flow, flow in the biofilter second cell is always upward.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 1A is a top view, block diagram of a wastewater treatment system constructed according to the invention.

FIG. 1B is a side view thereof.

FIG. 2 is a top view of the serpentine submerged attached growth reactor.

FIG. 3A is a left side view thereof.

FIG. 3B is a front view thereof.

FIG. 4 is a section view along the line 4-4 of FIG. 2.

DETAILED DESCRIPTION OF INVENTION

Referring to the drawings in detail wherein like elements are indicated by like numerals, there is shown a wastewater treatment system 1 constructed according to the principles of the present invention. There is shown a serpentine submerged attached growth bioreactor 10 connected to an anoxic/equalization tank 30 and a clear well 40. The equalization tank 30 receives the wastewater and provides primary settling of solids from the wastewater. The bioreactor treats the equalization tank wastewater output providing oxidation of carbonaceous matter, nitrification and denitrification. The treated wastewater output from bioreactor is passed to the clear well 40. The clear well 40 stores enough of the treated effluent to provide return flows and periodic backwashes. Excess treated effluent is continuously discharged from the clear well interior 44.

The equalization tank is comprised of a bottom 31, a top 32, and a side wall 33 interconnecting the bottom 31 and top 32, said bottom, top and side wall defining a hollow, equalization tank interior 34. The equalization tank 30 has an influent inlet 35 for receiving wastewater thereby providing a path for the wastewater from a source external to the equalization tank and into the equalization tank interior 34. The equalization tank 30 also has an outlet 36, which is in communication with a first inlet 15 of the bioreactor 10. The equalization tank 30 receives raw wastewater and provides primary settling of a solids component of the wastewater. The equalization tank 30 also has means for receiving backwash water in a reverse flow from the bioreactor 10 via a backwash/return pipe 26.

The bioreactor 10 is comprised of a bottom 11, a top 12 and a side wall 13 interconnecting the bottom 11 and top 12, said bottom, top and side wall defining a hollow, bioreactor interior 14. The bioreactor 10 has a first inlet 15, which is in communication with the equalization tank outlet 36. The bioreactor interior 14 has a three-cell biofilter comprised of an underdrain 16 above a plenum 21 adjacent the bioreactor bottom 11, and three filter cells, a first cell 17, a second cell 18 and a third cell 19. The three filter cells 17, 18, 19 have bottoms 24 terminating in the underdrain 16. The first two filter cell bottoms 24, 24' are closed. The third filter bottom 24" is open. The plenum 21 is an open space below the underdrain 16. Above the cells 17, 18, 19 is an open head space 20 within the bioreactor interior 14 adjacent the bioreactor top 12. The bioreactor 10 further includes an outlet backwash pipe 26 inserted through the bioreactor side wall 13 into the head space 20. The backwash pipe 26 is interconnected to the equalization tank 30.

Each filter cell is filled with filter media. Different filter media may be utilized in each of the filter cells to optimize treatment for oxidation of carbonaceous matter, nitrification or denitrification. In all cases the media would have a relatively high specific surface area. Each filter cell 17, 18, 19 also has an individual air line 23 brought through the side wall 13 into the head space 20 and down through each individual cell's filter media and terminating adjacent to each filter cell bottom 24, 24', 24". Each air line provides process air and backwash air to the individual biofilter cell. This configuration of air lines provides flexibility in aeration schemes for the different cells.

The clear well 40 is comprised of a bottom 41, a top 42, and a side wall 43 interconnecting the bottom 41 and top 42, said bottom, top and side wall defining a hollow, clear well interior 44. The clear well 40 includes a first inlet 45 with an external inlet pipe 46 connected to the bioreactor outlet 27. The clear well interior 44 may contain two pumps, depending upon size. In this embodiment, a two-pump arrangement is illustrated. The clear well interior 44 contains a first pump system 47 on the clear well bottom 41, said first pump being connected to said clear well first inlet 45 and being adapted to provide reverse flow from the clear well interior 44 back through the bioreactor interior 14. The clear well interior 44 also contains a second pump system 48 on the clear well bottom 41, said second pump being interconnected to a clear well discharge outlet 49, said second pump 48 adapted to discharge the contents of said clear well interior 44 out through said discharge outlet 49.

The equalization tank outlet 36 is positioned vertically lower than the equalization tank inlet 35, thereby creating a gravity flow through and out of the equalization tank interior 34. There is also a difference in vertical elevation between the equalization tank outlet 36 and the clear well first inlet 45, said clear well first inlet being vertically lower than the equalization tank outlet 36. This creates a gravity driving force of wastewater flow from the equalization tank 30 through the bioreactor 10 to the clear well 40.

Two significant features of this invention embodiment are novel. The wastewater flow through the bioreactor filter 16 is in two directions, i.e., down-flow (forward flow) and up-flow (reverse flow). In the forward flow direction, the flow is down the first cell 17, up through the second cell 18, and down through the third cell 19. The hydrostatic pressure created by the differential liquid levels within the tanks 30, 10, 40 is the driving force through the system, through the clear well inlet pipe 46 into the clear well first inlet 45 through the clear well idle first pump 47. The reverse flow is accomplished by the first pump 47 pumping liquid from the clear well interior 44 back up through the clear well first inlet 45, clear well inlet pipe 46, into the bioreactor interior 14, through the plenum 21, underdrain 16, through all three cells 17, 18, 19 from bottom to top, and fills the bioreactor head space 20 above the filter cells, and then begins to flow forward again in the serpentine direction through the filter cells as described above. Therefore, flow through the bioreactor 10 alternates between down flow and up flow. The system is also operated as a continuous flow process. Although some of the treated effluent in the clear well is cycled back through the bioreactor 10, treated effluent from the clear well is also continuously discharged.

In operation, wastewater is received into the anoxic/equalization tank 30. Primary settling of a solids component within the wastewater then takes place. The resultant wastewater with a substantial amount of solids removed is then passed through to the bioreactor 10 wherein the resultant wastewater enters into the top 25 of the first cell 17 flowing downward through the first cell filter media 22 to an opening in the wall 28 between the first and second cells adjacent the first cell closed bottom 24 and second cell closed bottom 24'. In the second cell 18 the wastewater flows up through the second cell filter media 22' to an opening in the wall 29 between the second cell and third cell adjacent the second cell and third cell tops 25' and 25" above the second cell media 22'. The wastewater then enters into the third cell 19, flowing downward through the third cell filter media 22" to the third cell open bottom 24". The wastewater then exits the bioreactor as treated effluent through the bioreactor outlet 27, into the clear well inlet pipe 46, into the clear well first inlet 45 into the clear well interior 44. A portion of the treated effluent is discharged from the clear well. Another portion of the clear well treated effluent is available for reverse flow and back wash.

It is understood that the above-described embodiment is merely illustrative of the application. Other embodiments may be readily devised by those skilled in the art which will embody the principles of the invention and fall within the spirit and scope thereof.

We claim:

1. A waste water treatment system, comprising:
an equalization tank adapted to receive wastewater and provide primary settling of solids from said waste water, resulting in equalized wastewater, said equalization tank comprised of a bottom, a top, and a side wall interconnecting the bottom and top, said bottom, top and side wall defining a hollow, equalization tank interior, said equalization tank having an influent inlet for receiving wastewater thereby providing a path for the wastewater from a source external to the equalization tank and into the equalization tank interior, said equalization tank also having an outlet, which is in communication with a bioreactor inlet and adapted to provide equalized wastewater to the bioreactor;

a submerged attached growth bioreactor connected to and adapted to receive the equalized wastewater output from said equalization tank and providing oxidation of carbonaceous matter, nitrification and denitrification of said equalization tank equalized wastewater output, said bioreactor comprised of a bottom, a top and a side wall interconnecting the bottom and top, said bioreactor bottom, top and side wall defining a hollow, bioreactor interior, said bioreactor having said bioreactor inlet in communication with said equalization tank outlet, said bioreactor interior having a biofilter comprised of three filter cells filled with filter media having a high specific surface area, and comprising a first cell, a second cell and a third cell, said filter cells being separated by vertical walls, said first filter cell having a top in communication with said equalization tank outlet and adapted to receive said equalized wastewater, a closed bottom, and an opening in the wall between the first and second filter cells adjacent the first filter cell bottom and a second filter cell bottom, said second filter cell having a top and a closed bottom, and an opening in the wall between the second filter cell and the third filter cell adjacent the second filter cell top and a third filter cell top above the second filter cell filter media, said third filter cell having an open bottom terminating in an underdrain positioned beneath said filter cells and above a plenum adjacent the bioreactor bottom, wherein said plenum is an open space below the underdrain, said bioreactor interior having an open head space above said filter cells adjacent the bioreactor top;

a clear well connected to and adapted to receive a treated wastewater output from said bioreactor storing a portion of the treated wastewater output to provide return flows and periodic backwashes, wherein a remainder of the treated wastewater output is discharged from the clear well interior;

wherein the clear well is comprised of a bottom, a top, and a side wall interconnecting the bottom and top, said bottom, top and side wall defining a hollow, clear well interior, said clear well having a clear well inlet with an external inlet pipe connected to a bioreactor outlet in fluid communication with the bioreactor plenum;

an outlet backwash pipe inserted through the bioreactor side wall into the head space interconnected to the equalization tank;

a plurality of air lines brought through the bioreactor side wall into the head space and down through each individual filter cell's filter media and terminating adjacent each filter cell bottom, each said air line providing process air and backwash air from an external source to each filter cell;

a plurality of pumps within said clear well interior, said plurality of pumps having a first pump on the clear well bottom, said first pump connected to said clear well inlet and adapted to provide reverse flow from the clear well interior back through the bioreactor interior, said plurality of pumps having a second pump on the clear well bottom, said second pump interconnected to a clear well discharge outlet, said second pump adapted to discharge the contents of said clear well interior out through said clear well discharge outlet;

wherein the equalization tank outlet is positioned vertically lower than the equalization tank inlet;

wherein the clear well inlet is positioned vertically lower than the equalization tank outlet;

wherein equalization tank wastewater with a substantial amount of solids removed is passed through to the bioreactor open head space, through the first filter cell top flowing downward through the first filter cell filter media to said opening in the wall between the first and second filter cells adjacent the first filter cell bottom and second filter cell bottom, into the second filter cell flowing upward through the second filter cell filter media to said opening in the wall between the second filter cell and third filter cell adjacent the second filter cell and third filter cell tops above the second filter cell filter media, then entering into the third filter cell, flowing downward through the third filter cell filter media to the third filter cell bottom, into the plenum and exiting the bioreactor as treated effluent through the bioreactor outlet into the clear well inlet pipe, into the clear well inlet pipe, into the clear well first inlet into the clear well interior.

2. A waste treatment system as recited in claim 1, wherein:

the first pump is adapted to provide a system reverse flow by pumping a liquid from the clear well interior back up through the clear well first inlet, clear well inlet pipe, into the bioreactor interior, through the plenum, underdrain, through all three filter cells, and filling the bioreactor head space above the filter cells.

\* \* \* \* \*